No. 790,769.  
Patented May 23, 1905.

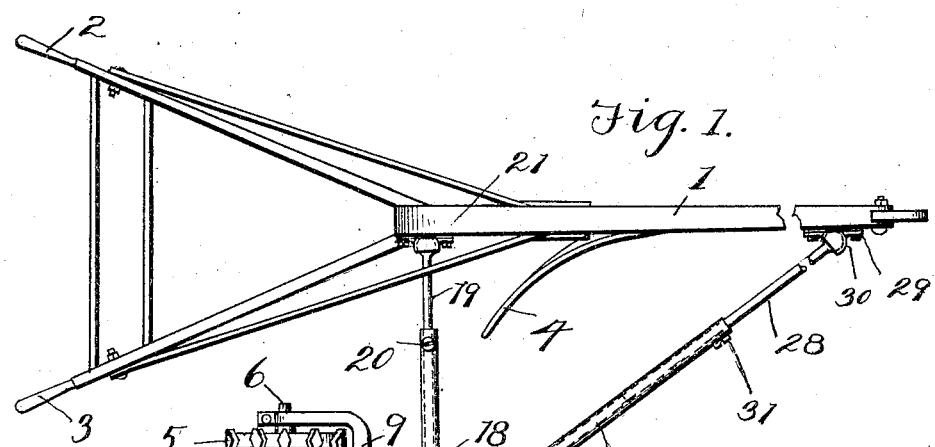
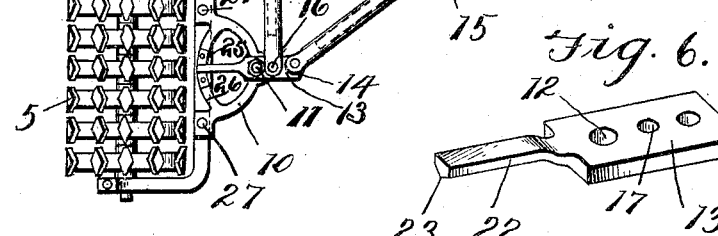
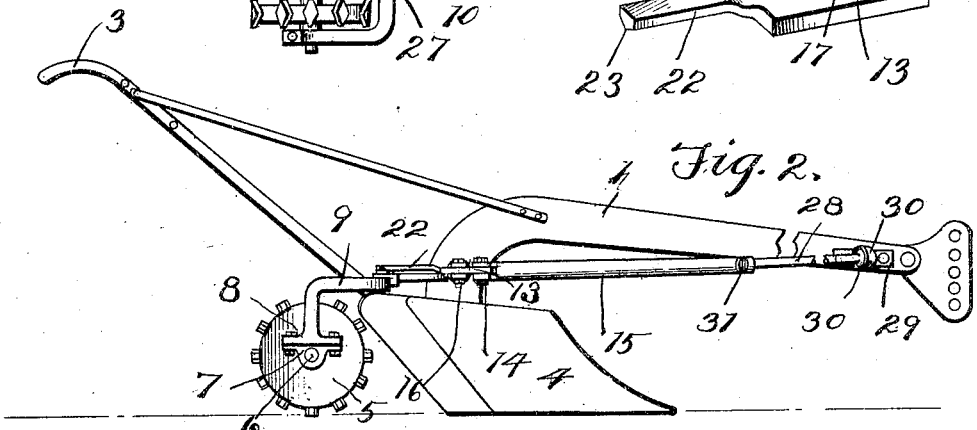
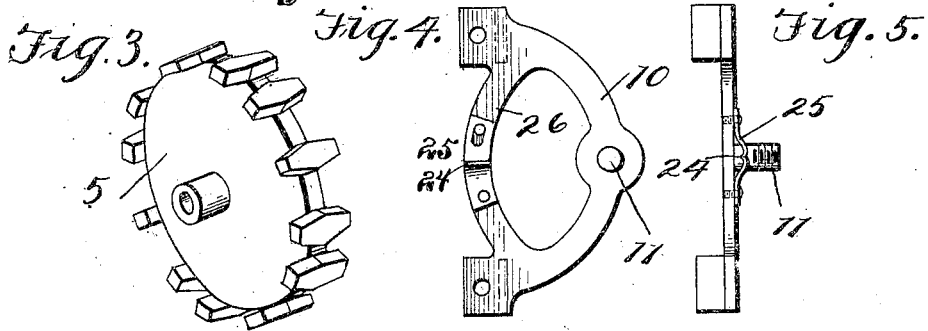

UNITED STATES PATENT OFFICE.

HENRY ADOLPH WILBERG, OF NOME, NORTH DAKOTA.

SOIL-PULVERIZING ATTACHMENT FOR PLOWS.

SPECIFICATION forming part of Letters Patent No. 790,769, dated May 23, 1905.

Application filed February 14, 1905. Serial No. 245,597.

*To all whom it may concern:*

Be it known that I, HENRY ADOLPH WILBERG, a citizen of the United States, residing at Nome, in the county of Barnes and State of North Dakota, have invented certain new and useful Improvements in Soil-Pulverizing Attachments for Plows; and I do hereby declare the following to be a full, clear, and exact description of the invention, such as will enable others skilled in the art to which it appertains to make and use the same.

My invention relates to a soil leveling and pulverizing attachment for breaking-plows and the like; and my invention consists of certain novel features of construction and combination of parts, the preferred form whereof will be hereinafter clearly set forth, and pointed out in the claims.

The main object of my invention, among others, is to provide a simple form of attachment which may be easily connected to the plow-beam and properly adjusted to ride over and smooth down and crush the coarser particles of soil, as clods, &c.

A further object is to render my attachment easily adjustable, whereby it may be disposed slightly in advance of the moldboard and to one side thereof or to the rear of said moldboard, whereby the soil will be thoroughly leveled and left in a finely-pulverized condition to form a seed-bed, thereby saving the extra labor of specifically harrowing or rolling the land.

Other objects and advantages will be hereinafter made clearly apparent, reference being had to the accompanying drawings, which are considered a part of this application, and in which—

Figure 1 shows a top plan view of my invention as applied to use upon a breaking-plow of the usual or any preferred construction. Fig. 2 is a side elevation of my invention complete ready for use. Fig. 3 is a detail in perspective, showing one of the plurality of wheels employed by me for crushing and leveling the freshly-plowed soil. Fig. 4 is a detail view showing a plan of the front portion of the framework of my pulverizer attachment. Fig. 5 is a rear edge view of the construction shown in Fig. 4. Fig. 6 is a detail in perspective, showing the controlling-finger designed to hold the cultivator-frame normally straight, but permitting said frame to be moved incident to the strain placed thereon in turning at the end of the furrow.

For convenience of description the various parts of my invention and accessories deemed necessary to coöperate therewith numerals will be employed, the same numeral applying to a similar part throughout the several views.

Referring to the numerals on the drawings, 1 indicates a plow-beam of any preferred variety, while 2 and 3 indicate the handles thereof, all substantially of the usual construction, while 4 indicates the moldboard of the plow designed to turn the furrow as the plow is drawn through the field. I attach my pulverizing and leveling appliance to the moldboard side of the plow, as clearly shown in Fig. 1, and my leveling attachment consists of a plurality of wheel-like members or segmental rollers 5, each having a roughened periphery and all of them rotatably mounted upon the shaft 6, the ends of which are secured in the brackets or bearing-seats 7, bolted to the framework 8, as shown in Fig. 2.

The framework 8 is substantially U-shaped in form, the front or middle member 9 of which is disposed parallel with the face of all the wheels, and has connected near its middle portion the forwardly-projecting member 10, provided at its central point with an upwardly-directed stud 11, which is designed to be extended upward through the aperture 12 in the plate 13, said plate being secured, by means of the bolt 14, to the bracing-rod 15. The plate 13 is also connected by the bolt 16, which passes through the aperture 17, to the outer end of the arm 18, said arm being preferably formed of a section of tubing, whereby the inner end thereof will receive the end of the rod 19, thus permitting the length of the arm to be adjusted and made shorter or longer, as desired, such adjustment being secured by means of the set-screw 20 or equivalent thereof.

The rod 19 is pivoted to the plow-beam by means of the bracket 21, so as to insure that any desired adjustment may be attained between said rod and the arm 18, whereby the pulverizing-wheels or roller composed thereof may be moved laterally outward or inward, so that the pulverizing-wheels will travel over the proper pathway to crush and level the earth as delivered from the moldboard. After the stud 11 is extended through the aperture 12 it is secured therein by a suitable nut, so that the stud may be left to turn freely in its seat in said aperture.

The plate 13, it will be observed by reference to Fig. 6, is provided with a rearward extension or finger 22, which is convex upon its lower edge, as indicated by the numeral 23, said convex face or V-shaped extension 23 being designed to be received by the recess 24 in the friction-spring 25, mounted upon the rearwardly-curved bar 26 of the connecting-plate 10, the latter, as before explained, being firmly secured to the framework 9 in any preferred way, as by the rivets 27 or equivalent means. It therefore follows that when the finger 22 rests in the recess 24 it will cause the pulverizer-wheels to travel over the soil and prevent the framework from swinging upon the pivot point or lug 11 excepting when the plow is being turned, when said finger will ride out of the recess 24, and thereby relieve the strain which would otherwise come upon the finger or connecting parts between the framework and the plate 13, it being understood that when the plow is again started upon its work the framework carrying the wheels being counterbalanced by equal distribution of weight will conform to its normal position and travel at right angles to the plane of the plow.

It will be understood that the teeth upon the segmental members or wheels 5 may be of any desired character and length to best perform their office of crushing and leveling the soil, reducing the clods and coarser particles to a pulverized condition, and thereby prepare the surface of the soil for a perfect seed-bed, rendering it unnecessary to follow the plow with the harrow or roller, as is now common.

I prefer to form the member 15 of a section of tubing, when the rear end thereof may be flattened and provided with an aperture to receive a bolt 14, as before explained, while the forward end is designed to loosely receive the connecting-rod 28, the forward end of which is pivoted to the plow-beam at any desired point by means of the bracket 29 and the ball and socket 30, as shown in Fig. 1.

The tubular member 15 and the connecting-rod 28 may be relatively adjusted and secured by means of the set-screw 31 or equivalent device, and it therefore follows that by a proper adjustment of the framework and securing the set-screws 20 and 31 in their respective operative positions my improved soil-pulverizing attachment may be secured in its operative positions, so that the crushing-wheels will follow immediately upon the newly-turned furrow, or said wheels may be moved farther away from the plow, so as to act upon the next preceding furrow, as may be deemed productive of the best results.

The various parts of my invention may be cheaply and expeditiously manufactured and each assembled in its operative position, and while I have described the preferred combination and construction of parts I desire to comprehend in this application all such substantial equivalents and substitutes as may be considered as falling fairly within the scope and purview of my invention.

Having thus fully described my invention, what I claim as new, and desire to secure by Letters Patent, is—

The herein-described plow attachment designed for pulverizing and leveling the surface of the soil as a seed-bed and comprising a plurality of crushing-wheels rotatably mounted side by side in a suitable framework; means to adjustably connect said framework to the plow-beam whereby the crushing-wheels will be secured at any point deemed productive of the best results and an extension or finger 22 frictionally engaging a spring-plate 25 and designed to hold the wheel-carrying frame normally disposed at right angles to the plane of the plow, but permitting said framework to swing upon its pivot-point incident to the turning of the plow at the end of the furrow, all combined substantially as specified and for the purpose set forth.

In testimony whereof I have signed my name to this specification in the presence of two subscribing witnesses.

HENRY ADOLPH WILBERG.

Witnesses:
OLE HANSON,
THEO. TORBENSON.